Feb. 24, 1959  P. N. ERICKSON  2,874,992
AUTOMOBILE TIE-DOWN DEVICE FOR TRANSPORT TRAILERS
Filed Oct. 1, 1956  2 Sheets-Sheet 1
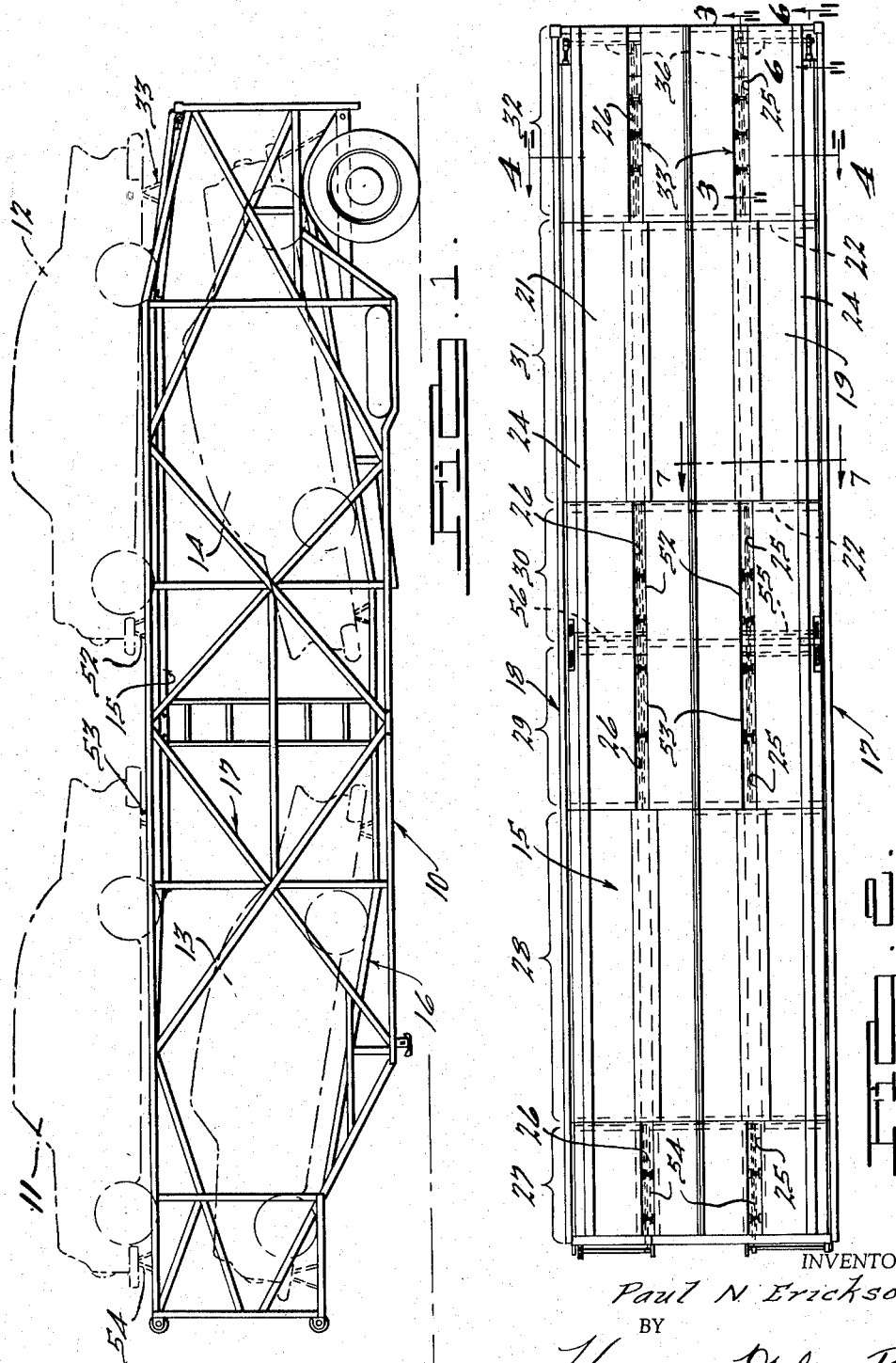
INVENTOR.
Paul N. Erickson
BY
Harness, Dickey & Pierce
ATTORNEYS Feb. 24, 1959          P. N. ERICKSON          2,874,992
AUTOMOBILE TIE-DOWN DEVICE FOR TRANSPORT TRAILERS
Filed Oct. 1, 1956          2 Sheets-Sheet 2
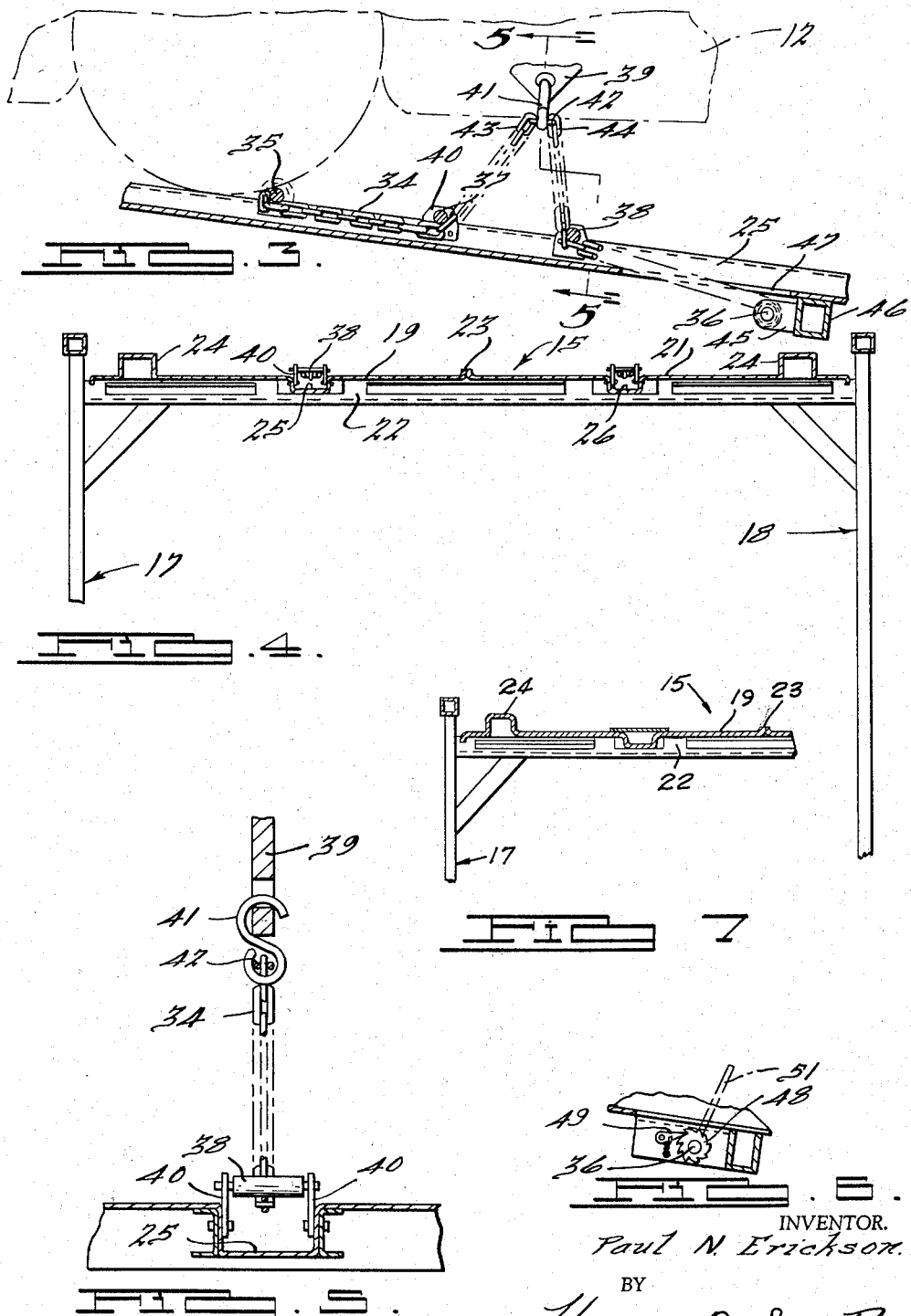
INVENTOR.
Paul N. Erickson.
BY
Harness, Dickey & Pierce
ATTORNEYS.

United States Patent Office 2,874,992
Patented Feb. 24, 1959

2,874,992

AUTOMOBILE TIE-DOWN DEVICE FOR TRANSPORT TRAILERS

Paul N. Erickson, Detroit, Mich., assignor to Fruehauf Trailer Company

Application October 1, 1956, Serial No. 613,008

9 Claims. (Cl. 296—1)

This invention relates to transport trailers, and more particularly to tie-down devices for use on so-called "haulaway" trailers which carry a plurality of passenger vehicles.

The increasing variety of passenger car styles in recent years has created problems in the transportation of such vehicles by haulaway trailers of the type which carry a plurality of such vehicles at different levels, the vehicles on each level being in tandem relation. Since the lengths of passenger cars today vary greatly, especially as between lower and higher priced models and even from year to year with the same model, the provision of vehicle tie-down means on trailers which must transport different vehicle models has heretofore required much wasted time and material, since the location of the tie-down connections on vehicles will vary greatly both in a longitudinal direction and in height above the ground level.

It is an object of the present invention to provide a novel and improved tie-down device for use on automobile transport trailers, which will be universal in its application and may be used to firmly secure vehicles of any standard size, within wide limits, to the track surface of the trailer, regardless of the height and longitudinal position of the tie-down connections on the vehicle.

It is another object to provide an improved tie-down mechanism of the above nature, which is relatively simple in construction and requires only a few manipulations to secure both front and rear ends of each vehicle.

It is also an object to provide an improved tie-down device of the above character, which will automatically exert strong resistance to movement of the secured vehicle in a longitudinal direction, thus preventing forward or rearward rolling which might damage the vehicle or cause undue wear on the tires during long hauls.

It is a further object to provide, in conjunction with an improved tie-down connection of this nature, means for preventing grease or oil from the vehicles on the upper level of an automobile transport trailer from damaging the finish on cars supported on the lower level.

Other objects, features and advantages of the present invention will become apparent from the subsequent description, taken in conjunction with the accompanying drawings.

In the drawings:

Figure 1 is a side elevational view of a vehicle transport trailer incorporating the improved tie-down device of this invention;

Figure 2 is a plan view of the trailer, showing the location and exposed portions of the tie-down chains;

Figure 3 is a fragmentary detailed view in elevation taken along the line 3—3 of Figure 2 and showing the manner in which a single tie-down chain is connected to a vehicle;

Figure 4 is a transverse cross-sectional view in elevation taken along the line 4—4 of Figure 2 and showing the location of the tie-down chains in a lateral direction;

Figure 5 is a detailed cross-sectional view in elevation taken along the line 5—5 of Figure 3 and showing the cooperation of a tie-down chain with one of the roller bars;

Figure 6 is a fragmentary cross-sectional view in elevation taken along the line 6—6 of Figure 2 and showing the pawl and ratchet on a chain winding shaft, and Figure 7 is a fragmentary transverse cross-sectional view taken along the line 7—7 of Figure 2 and showing the construction of an intermediate portion of the upper track.

In general terms, the invention comprises a plurality of pairs of chains longitudinally disposed in troughs or channels formed along the vehicle-supporting tracks of an automobile transport trailer. A major portion of each of these chains is exposed, and a plurality of transverse roller bars are fixed to the track above each chain at longitudinally spaced points. One end of each chain is secured to the track, and the other end may be drawn up on a winding shaft. Enough slack is provided in each chain so that it may be drawn upwardly between any two selected adjacent rollers, depending upon the location of the tie-down connections on the vehicle to be secured. The apex of the inverted V formed by the upwardly drawn portion of the chain may then be secured to the vehicle by a short S-shaped connection. Two such connections may be made between each pair of chains and its corresponding vehicle, thus causing the chains to be attached to the left and right tie-down connections at both the front and rear of the vehicle. The chains may then be tightened by a pawl and ratchet mechanism on the winding shaft, thus causing the chains to become taut at both tie-down connections.

Because of the configuration of each chain with respect to its tie-down connection, and the opposing pull of chains at the front and rear of each vehicle, substantial longitudinal movement of the vehicles will be prevented, and the trailer may traverse rough roads and long distances with the vehicles remaining in firmly secured position. Sufficient chains will of course be provided to accommodate the number of vehicles which the trailer is intended to transport. The upper decking of the trailer is preferably provided with a track comprising substantially solid plates, thus preventing inadvertent damage to cars on the lower level due to grease or oil dripping from the upper vehicles.

Referring more specifically to the drawings, the invention is shown as embodied in a haulaway trailer generally indicated at 10 of the type adapted to transport four passenger vehicles 11, 12, 13 and 14. Vehicles 11 and 12 are carried on an upper track generally indicated at 15, while vehicles 13 and 14 are supported by a lower track generally indicated at 16. The general construction of trailer 10 is similar to that disclosed and claimed in applicant's co-pending application Serial No. 563,644, filed February 6, 1956, and assigned to the assignee of the present application. In particular, the trailer has a pair of identical side frames generally indicated at 17 and 18 respectively, each side frame being composed of a triple diamond truss construction with appropriate additional bracing.

The universal tie-down means comprising the present invention may be incorporated in either or both of tracks 15 and 16 and is adapted to secure the front and rear ends of vehicles carried by the trailer. In the illustrated embodiment, the novel tie-down device is shown as securing the front and rear ends of each of vehicles 11, 12 and 13, and the rear end of vehicle 14, a different and conventional type of tie-down means being utilized for the front end of vehicle 14 which faces the rear of the trailer. The number of points at which the novel tie-down device is applied on any given type of trailer will depend upon the loading procedure in each case and other individual requirements.

The construction of upper and lower tracks 15 and 16 is best seen in Figures 2 and 4. A typical portion of upper track 15 comprises a pair of plates 19 and 21 supported by beams 22 which extend between side frames 17 and 18. The width of each of plates 19 and 21 is one-half the span of beams 22, and the plates are symmetrical about the longitudinal trailer axis and are secured together at their juncture 23, each plate being provided with a longitudinally extending guide ridge 24 for the vehicle wheels. Interiorly of ridges 24 are a pair of longitudinally extending troughs 25 and 26 formed in plates 19 and 21 respectively. As seen in Figure 2, these troughs are located below the tie-down connections of the loaded vehicles. In the illustrated embodiment, upper track 15 is composed of six sections, three of which are adapted to support each of vehicles 11 and 12. The three sections which support vehicle 11 are designated 27, 28 and 29, while those which support vehicle 12 are marked 30, 31 and 32. Troughs 25 and 26 will therefore be provided in sections 27 and 29 below vehicle 11 and sections 30 and 32 below vehicle 12. It will be noted that the construction of track 15 is such that no apertures will be disposed below either of the vehicles mounted thereon, so that the possibility of oil or grease dripping onto cars below will be avoided.

The construction of one of the novel tie-down devices of this invention is shown in detail in Figures 3, 5 and 6. For illustrative purposes, the tie-down device shown in detail is that used to secure the left rear portion of vehicle 12, this particular tie-down device along with the right rear unit being indicated generally at 33 in Figures 1 and 2. The device comprises a chain 34 secured at one end to a bar 35 which extends transversely across channel 25, chain 34 extending rearwardly from its fastening point and being wrapped around and secured to a rotatable shaft 36 mounted at the rear portion of track 15 below track level. Chain 34 passes under a plurality of additional bars, two such bars 37 and 38 being shown in the illustrated embodiment. Each of these bars extends across trough 25, and the length of chain 34 is such that it may be drawn upwardly between any two adjacent bars. It will be understood that the number and spacing of the bars may vary in accordance with individual requirements. In any case, the longitudinal distance occupied by the bars is such that the tie-down connection of any standard vehicle, regardless of its length, will be located above the area occupied by the bars when the vehicle is in loaded position. In the illustrated embodiment, the tie-down connection 39 of vehicle 12 is shown as being located between bars 37 and 38, so that chain 34 may be drawn upwardly between these two bars in order to be connected to member 39. Preferably, bars 37 and 38 are rotatably mounted between upstanding brackets 40 in order to reduce friction during movement of chain 34.

The means for connecting chain 34 to the tie-down member of the vehicle comprises, in the illustrated embodiment, a short S-shaped hook 41, seen in Figure 5, having one portion hooked to tie-down member 39 of vehicle 12, and the other portion hooked under one of the links in chain 34, the links on both sides of that engaged by hook 41 thus extending downwardly in angular relation therewith. In this manner, it will be observed that links 43 and 44 on either side of hook 41 will engage the hook in such fashion that longitudinal movement of this portion of the hook will be substantially prevented. It will be understood that other means for preventing longitudinal as well as vertical movement between chain 34 and member 39 could be provided within the principles of the invention.

Shaft 36 is disposed somewhat below the level of troughs 25 and 26, being supported by brackets 45 attached to cross beam 46, as shown in Figure 3. A clearance slot 47 is provided in trough 25 so that chain 34 may extend from bar 38 to shaft 36. A pawl and ratchet mechanism is associated with shaft 36 in order that chain 34 may be tightened. This mechanism comprises a ratchet 48 secured to shaft 36 and a pawl 49 pivotally mounted adjacent ratchet 48 and spring-urged against the ratchet. The arrangement is such that, as shown in Figures 3 and 6, shaft 36 may be rotated clockwise by means such as a removable handle 51. Counterclockwise rotation will however be prevented by pawl 49 unless the latter is manually lifted from engagement with ratchet 48. It will thus be seen that, after chain 34 has been connected with tie-down member 39 of vehicle 12, rotation of shaft 36 will cause the vehicle to be drawn down securely against track 15 with chain 34 in taut position and preventing longitudinal movement of the vehicle in either direction.

The remaining tie-down devices shown in Figure 1 are constructed similarly to device 33, and therefore need not be described in detail. In Figure 1, the tie-down devices for the forward end of vehicle 12 are indicated at 52, while those for the rear and front ends respectively of vehicle 11 are designated at 53 and 54. The arrangement is such that the tie-down means at opposite ends of each vehicle will be drawn up in opposite directions, thereby providing additional insurance against any longitudinal movement during transit. As seen best in Figure 2, the take-up shafts 55 and 56 for the two tie-down devices 52 at the front end of vehicle 12 are so located that the chains of these two devices will be drawn forwardly during tightening. Since the chains 34 of tie-down means 33 at the rear end of vehicle 12 will be tightened rearwardly, the result will be the creation of longitudinal forces in opposite directions, thus preventing any rolling motion of vehicle 12. It will be obvious from an examination of Figure 2 that the tie-down devices 53 and 54 for vehicle 11 are arranged in a similar manner. The tie-down means for vehicles 13 and 14 are not visible in Figure 2 and will not be described in detail, since the arrangement for any vehicle secured at both its front and rear ends by the novel tie-down device will be apparent from the foregoing description.

In operation, vehicles will be loaded onto trailer 10 in any approved manner, resting in their final position on tracks 15 and 16 as shown substantially in Figure 1, with guide ridges 24 preventing lateral movement. Assuming that the length of vehicle 12 is such that its rear tie-down member 39 is substantially above the space between bars 37 and 38, chain 34 will be slackened and drawn upwardly between bars 37 and 38. The portion of chain 34 most closely adjacent tie-down member 39 will be connected to the tie-down member by means of S-hook 41, in the manner shown in Figures 3 and 5. Shaft 36 will then be rotated by handle 51 until chain 34 becomes taut. This operation will be performed for both the left and right rear tie-down devices 33 at the rear end of vehicle 12. The operation will be repeated for the left and right front tie-down devices 52 of vehicle 12. In the case of devices 52, the chain will be taken up forwardly instead of rearwardly. The chain of each tie-down device will thus form an inverted V with its apex closely adjacent the vehicle tie-down member, and a maximum degree of restraint against longitudinal movement of the vehicle will thus be obtained.

The other vehicles loaded on trailer 10 will be secured in a manner similar to that described above, except for vehicles for which the novel tie-down means are not provided. Should the size of vehicle 12 be such that the rear tie-down member 39 is above the space between bars 35 and 37 instead of that between bars 37 and 38, chain 34 may be drawn upwardly between bars 35 and 37 and secured to the vehicle in the same manner as described above. After tightening chain 34, the resulting tie-down connection will be just as secure as if the connection had been made with chain 34 drawn up between bars 37 and 38. Similarly, chain 34 may be drawn up between bar 38 and shaft 36, should the vehicle tie-down connection be located in this area. It will thus be seen that a universal tie-down means is provided which is suitable for securing vehicles of any standard length and with tie-down connections of varying heights, and that vehicles of different lengths could be secured to the same trailer at the same time without the need for any mechanical adjustment whatsoever. Longitudinal movement of the vehicles held by the novel tie-down device will be prevented because of the inherent configuration and stability of the parts as described above. None of the elements of the tie-down means will interfere in any way with the loading or unloading of the vehicles on trailer 10. When it is desired to unload the trailer, the chain of each tie-down connection will be loosened by disengaging pawl 49 from ratchet 51. S-shaped hooks 41 may then be disengaged from the tie-down members of their respective vehicles, and the vehicles unloaded from the trailer in a conventional manner.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In an automobile tie-down device for transport trailers of the type having a track for supporting a vehicle, a chain extending in the direction of said track, means securing one end of said chain to said track, a plurality of longitudinally spaced bars extending transversely across and above a portion of said track, said chain extending longitudinally beneath said bars, means connected to the other end of said chain for drawing the chain taut, the length of said chain being sufficient to permit upward withdrawal thereof between any two adjacent bars to form an inverted V, and means for connecting the apex of such inverted V to a tie-down member on a vehicle.

2. In a device for securing a vehicle to a transport trailer, a chain extending longitudinally with respect to said vehicle, means stationarily securing one end of said chain to said trailer, means for drawing up the other end of said chain, at least one bar on said trailer extending transversely above and between the ends of said chain, the chain being of sufficient length to permit upward withdrawal between any two adjacent bars or between either end of the chain and an adjacent bar to form an inverted V, and means for connecting the apex of such V to the tie-down connection of a vehicle.

3. In a tie-down device for holding automotive vehicles on transport trailers, a track for supporting a vehicle, a longitudinally extending trough formed in said track, a plurality of longitudinally spaced bars secured to said track and extending across said trough, a chain disposed within said trough and below said bars, means securing one end of said chain to said track, means for selectively tightening or releasing the other end of said chain, the chain being of sufficient length to permit upward withdrawal thereof between any two adjacent bars to form an inverted V, and means for connecting the apex of such V to the tie-down connection of a vehicle.

4. The combination according to claim 3, said selective means comprising a rotatable shaft, said other end of the chain being secured to said shaft, and a pawl and ratchet mechanism on said shaft for permitting rotation thereof in only one direction.

5. The combination according to claim 4, said bars being rotatably mounted with respect to said track, whereby frictional forces between said chain and said bars will be prevented.

6. The combination according to claim 4, said connecting means between said chain and vehicle tie-down member comprising an S-shaped hook, one portion of said hook being of such thickness relative to the size of the links in said chain that the two links adjacent a link engaged by said hook portion will be closely adjacent the sides of said hook portion.

7. Tie-down means for securing the front and rear ends of an automotive vehicle to a transport trailer, comprising a track for supporting said vehicle, a first chain on one portion of said track, a second chain at a longitudinally spaced portion of said track, said two chains extending longitudinally and being substantially beneath front and rear tie-down members of a vehicle when disposed on said track, the ends of said chains closer to each other being stationarily secured to said track, a plurality of longitudinally spaced transversely extending bars secured to the track above each of said two chains, means at the outer end of each chain for selectively tightening or releasing said chain, each chain being of such length that a portion thereof may be drawn upwardly between any two adjacent bars to form an inverted V, and means for connecting each of said two chains at the apex of its inverted V to its adjacent vehicle tie-down member, said last-mentioned connecting means each comprising a relatively short member, whereby tightening of said two chains will cause oppositely directed longitudinal forces to be exerted on the secured vehicle.

8. In an automobile transport trailer of the type having upper and lower tracks each supporting a plurality of vehicles, a pair of side frames, a plurality of cross beams secured between said frames for supporting said upper track, and upper track comprising a pair of plates supported by said cross beams, each plate being of a width substantially equal to half the span of said cross beams, means securing together the adjacent edges of said plates, a pair of longitudinally extending wheel guide ridges formed along the outer edges of said plates, a pair of troughs extending longitudinally along intermediate portions of said plates, a pair of chains disposed within said troughs, means securing corresponding ends of said chains to their respective plates, means at the opposite ends of said chains for selectively tightening or releasing said chains, a plurality of bars in longitudinally spaced relation above each chain, said bars each being secured to their respective plates, said chains each being of sufficient length to be drawn upwardly between two adjacent bars to form an inverted V, and means for securing the apex of each such inverted V to a tie-down member of a vehicle in closely spaced relation thereto.

9. In an upper track construction for an automobile transport trailer of the type carrying vehicles at two levels, six longitudinally adjacent track sections, said sections being of such length that three adjacent sections will support one vehicle and the other three sections will support the other vehicle, each section being composed of a pair of unapertured plates each extending half the width of said track, a longitudinally extending trough formed in each plate of the front and rear track sections of one vehicle and the front and rear track sections of the other vehicle, chains disposed within said troughs, the chains below the front of each vehicle being secured to said track at their rear ends and the chains disposed below the rear end of each vehicle being secured to said track at their front ends, means for drawing tight the free ends of each of said chains, a plurality of transversely extending bars secured above each of said troughs in longitudinally spaced relation, said chains each being of sufficient length that the chains may be drawn upwardly between two adjacent bars to form an inverted V, and means for connecting the apex of the inverted V thus formed by each chain to the tie-down connection of a vehicle in closely spaced relation thereto.

References Cited in the file of this patent

UNITED STATES PATENTS

| | | |
|---|---|---|
| 1,931,803 | Perkins | Oct. 24, 1933 |
| 2,178,693 | McMullen | Nov. 7, 1939 |
| 2,185,514 | Mussey | Jan. 2, 1940 |
| 2,766,898 | Risner | Oct. 16, 1956 |